(12) United States Patent
Nakahara

(10) Patent No.: US 7,997,583 B2
(45) Date of Patent: Aug. 16, 2011

(54) MECHANICAL SEALING DEVICE

(75) Inventor: Nobuo Nakahara, Minato-ku (JP)

(73) Assignee: Eagle Industry Co., Ltd., Tokyo (JP)

(*) Notice: Subject to any disclaimer, the term of this patent is extended or adjusted under 35 U.S.C. 154(b) by 0 days.

(21) Appl. No.: 12/092,656

(22) PCT Filed: Nov. 2, 2006

(86) PCT No.: PCT/JP2006/322008
§ 371 (c)(1),
(2), (4) Date: Jul. 1, 2008

(87) PCT Pub. No.: WO2007/055156
PCT Pub. Date: May 18, 2007

(65) Prior Publication Data
US 2008/0303221 A1  Dec. 11, 2008

(30) Foreign Application Priority Data
Nov. 8, 2005 (JP) .................................. 2005-324066

(51) Int. Cl.
*F16J 15/38* (2006.01)
(52) U.S. Cl. ........................................................ 277/390
(58) Field of Classification Search .................. 277/390, 277/584
See application file for complete search history.

(56) References Cited

U.S. PATENT DOCUMENTS

| | | | | |
|---|---|---|---|---|
| 2,456,356 A * | 12/1948 | Aber | ............................. | 277/584 |
| 3,097,855 A * | 7/1963 | Allen | ............................. | 277/584 |
| 3,455,566 A * | 7/1969 | Hull et al. | ..................... | 277/582 |
| 4,552,368 A * | 11/1985 | Wallace | ....................... | 277/387 |
| 5,123,662 A * | 6/1992 | Sugimura | ..................... | 277/584 |
| 7,516,963 B2 * | 4/2009 | Meller | ........................... | 277/584 |

FOREIGN PATENT DOCUMENTS

| | | |
|---|---|---|
| JP | 48-013742 A | 2/1973 |
| JP | 61-073964 A | 5/1986 |
| JP | 2000-193099 A | 7/2000 |
| JP | 2001-221344 A | 8/2001 |
| JP | 2002-156042 A | 5/2002 |
| JP | 2006-177500 A | 7/2006 |

* cited by examiner

*Primary Examiner* — Shane Bomar
*Assistant Examiner* — Gilbert Y Lee
(74) *Attorney, Agent, or Firm* — Arent & Fox LLP (57) ABSTRACT

A mechanical sealing device includes a stationary slide ring, a rotary slide ring which rotary slides and closely contacts the stationary slide ring, an O-ring located between an inner bore of the rotary slide ring and the rotary shaft. An annular ring member has a relatively lower gas permeability than that of the O-ring and is provided in the inner bore of the rotary slide ring so as to adjoin the O-ring at an atmosphere side of the sealing device, wherein the following expression D1<D2<D3 is satisfied. D1 is a diameter of the rotary shaft, D2 is an inner diameter of the annular projected portion of the ring member, and D3 is an inner diameter of a portion at the atmosphere side from the ring member in the inner bore of the rotary slide ring.

1 Claim, 8 Drawing Sheets

MECHANICAL SEALING DEVICE

CROSS-REFERENCE TO RELATED APPLICATION

This application is a National Stage entry of International Application No. PCT/JP2006/322008, filed Nov. 2, 2006, the entire specification claims and drawings of which are incorporated herewith by reference.

TECHNICAL FIELD

This invention relates to a mechanical sealing device for high pressure to seal a rotary axis, particularly relates to a mechanical sealing device preferably used for sealing $CO_2$ refrigerant in a compressor of a air-conditioning apparatus and the like using $CO_2$ gas as refrigerant.

BACKGROUND ART

Figure 7:
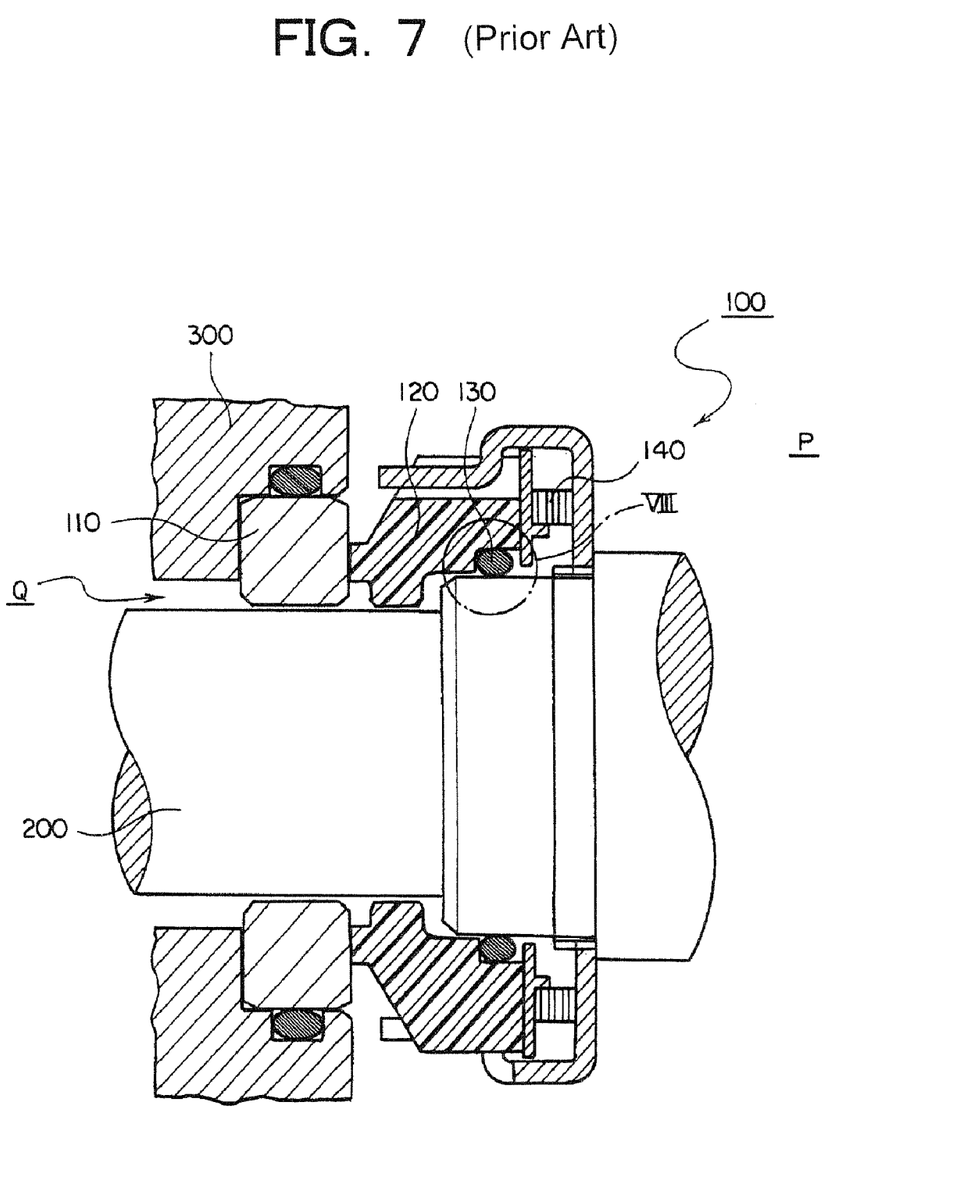
FIG. 7 is a cross sectional view of a conventional mechanical sealing device.
Figure 8:
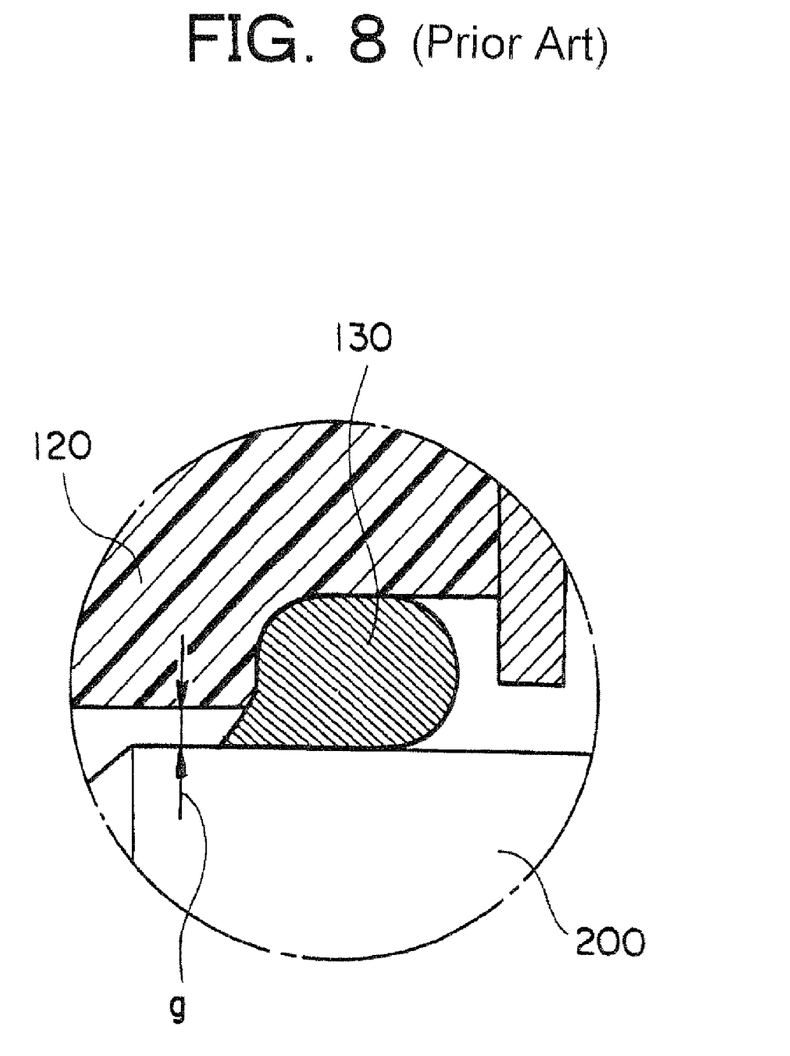
FIG. 8 is an enlarged view of a portion VIII of FIG. 7.

FIG. 7 is a cross sectional view of a conventional mechanical sealing device, and FIG. 8 is an enlarged view of VIII portion of FIG. 7.

As a mechanical sealing device for sealing high pressure refrigerant like $CO_2$, for example, a mechanical sealing device 100 shown in FIG. 7 has been known conventionally (for example, refer to Patent Document 1). This sealing device 100 comprises a mating ring 110 hermetically fixed to a housing 300, a seal ring 120 rotating with a rotary shaft 200 and sliding closely contact with the mating ring 110 and an O-ring 130 equipped between the seal ring 120 and the rotary shaft 200.

In this mechanical sealing device 100, even in case that the rotary shaft 200 moves to a thrust direction, a wavespring 140 energizes the sealing ring 120 to the mating ring 110 side, the sealing ring 120 follows the mating ring 110 along the thrust direction. Therefore, the sealing ring 120 closely contacts with the mating ring 110 constantly.

However, due to $CO_2$ refrigerant is high pressure, as shown in FIG. 8, there is sometimes the O-ring 130 pushed to atmosphere Q side bites into a space g formed between the seal ring 120 and the rotary shaft 200. When the rotary shaft 200 moves to thrust direction in a status that the O-ring 130 bites into the space g, the sealing ring 120 also moves according to the moving of the shaft, as a result, there is a case that preferable sealing effect cannot be maintained due to a betweenness of the mating ring 100 and the sealing ring 120 widens.

Also, since a rubber constitutes the O-ring has a character that $CO_2$ as refrigerant can easily permeate, the refrigerant permeates the O-ring and flows into atmosphere Q side, there is a case that preferable sealing effect cannot be maintained.
Patent Document 1: Japanese Unexamined Patent Publications No. 2001-221344

DISCLOSURE OF INVENTION

Problem to be Solved by Invention

The present invention is objected to provide a mechanical sealing device has excellent sealing effect.

Means for Solving the Problem

The present invention is made to solve the above mentioned technical problem, and means for solving the problem are constituted as follows.

A mechanical sealing device of the present invention comprises;
a stationary slide ring hermetically fixed in a housing;
a rotary slide ring which slides and closely contacts with said stationary slide ring, the rotary slide ring being rotatable with a rotary shaft inserted to an inner bore; and,
an O-ring equipped between a inner bore of said rotary slide ring and said rotary shaft; wherein,
said mechanical sealing device further comprises an annular ring member having relatively lower gas permeability with respect to that of said O-ring;
said ring member is provided in said inner bore of the rotary slide ring so as to adjoin said O-ring at atmosphere side; and,
the mechanical sealing device satisfies a following conditional expression (1):

$$D1<D2<D3 \qquad \text{expression (1)},$$

In which, D1 is a diameter of said rotary shaft, D2 is an inner diameter of said ring member, and D3 is an inner diameter of a portion positioned at atmosphere side from said ring member in the inner bore of said rotary side slid ring.

In the present invention, by a ring member which satisfies a relation D2<D3 adjoining an O-ring at atmosphere side, a space g can be narrowed (reducing a permeating cross sectional area), biting of the O-ring to the space g is prevented. Also, by the ring member satisfies a relation of D1<D2, the ring member can be arranged and spaced to an outer circumference surface of the rotary shaft. Therefore, by providing a ring member which satisfies the above conditional expression (1), excellent seal effect can be maintained, since following character of the rotary slide ring to the stationary slide ring can be sufficient sufficiently.

Also, in the present invention, the ring member comprises relatively lower gas permeability with respect to the O-ring. Thereby, excellent sealing character can be maintained, since it becomes possible to prevent effluent of gas to atmosphere side by permeation.

Preferably, said ring member comprises a tapered outer circumference surface whose outer diameter becomes smaller towards atmosphere side from high pressure environment side;
the inner bore of said rotary slide ring comprises a tapered inner circumference face whose diameter becomes smaller towards atmosphere side from high pressure environment side, as corresponding to the tapered outer circumference surface of said ring member;
the tapered outer circumference surface of said ring member and the tapered inner circumference surface of said rotary slide ring contact each other.

According to the above constitution, when the ring member is pressed to atmosphere side via the O-ring by a pressure of high pressure environment, the tapered circumference surface of the ring member slides along with the tapered inner circumference of the rotary slide ring. For this reason, the space g can be narrowed further by applying a pressure force to a direction that an inner diameter of the ring member becomes smaller.

Further, applying the pressure force to a diameter direction so as to narrower the space g, more improved sealing character can be maintained, because a permeate cross sectional are becomes smaller.

Preferably, said inner circumference surface of said ring member comprises a projection portion projected to radially inward, said projection portion is at least provided on a portion adjoining said O-ring in a cross sectional along with axial direction of said ring member.

According to the above constitution, in case that the ring member contacts with the rotary shaft, a contact area thereof can be decreased. For this reason, in case that the rotary shaft moves along with the thrust direction, a frictional resistance between the rotary shaft and the ring member can be decreased, a following character of the rotary slide ring can be improved further.

According to the present invention, a mechanical sealing device having excellent sealing performance can be provided because the following character of the rotary slide ring along with the thrust direction can be improved as well as the gas effluent to the atmosphere side can be prevented.

BEST MODE FOR CARRYING OUT THE INVENTION

Below, embodiments of the present invention will be described based on drawings.

Figure 1:
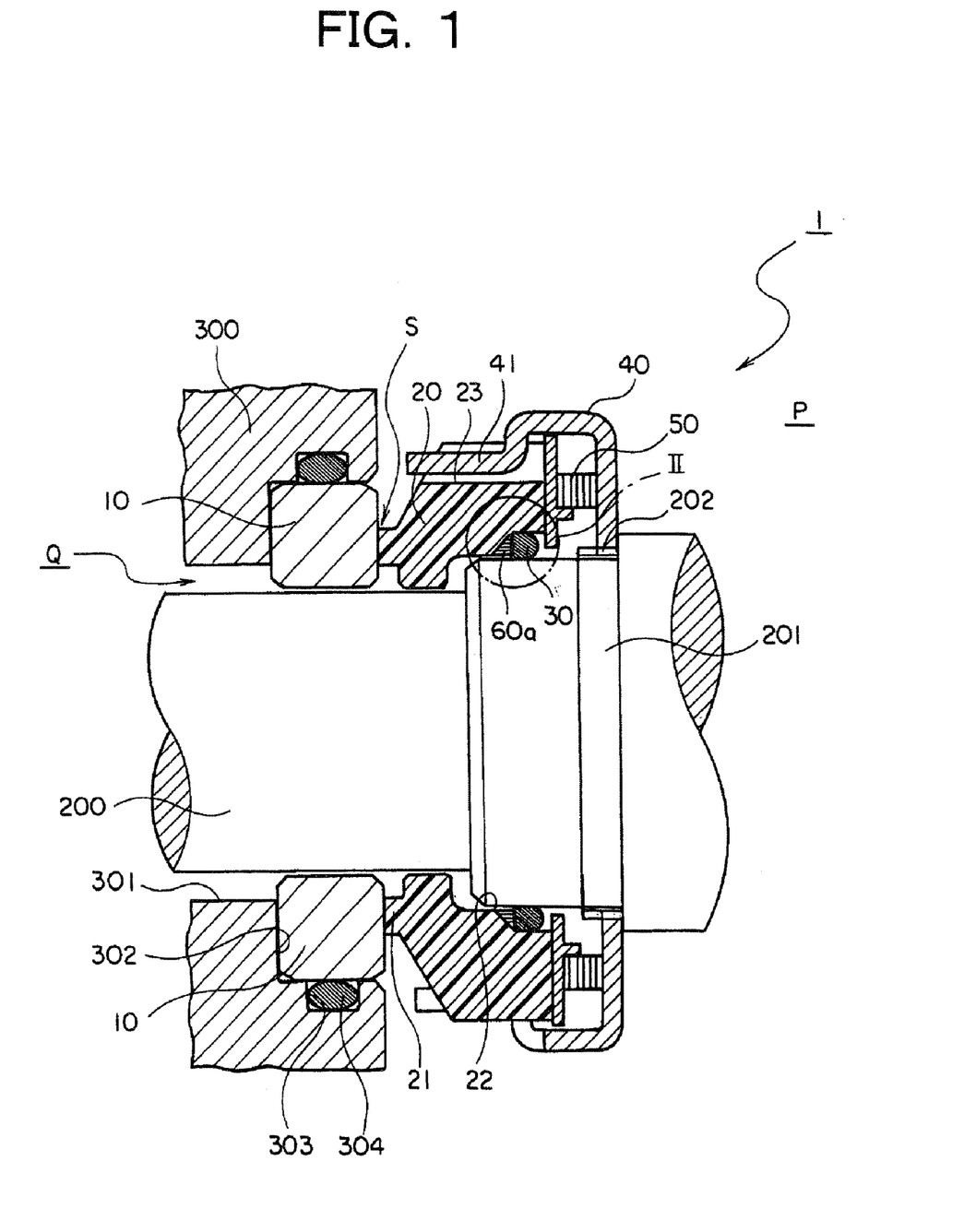
FIG. 1 is a cross sectional view of a mechanical sealing device according to a first embodiment of the present invention.

A mechanical sealing device according to a first embodiment of the present invention 1 is a device for sealing a surrounding area of a rotary shaft 200 which is inserted through a housing 300 in a compressor for $CO_2$ refrigerant, as shown in FIG. 1.

The mechanical sealing device 1 comprises a mating ring 10 equipped at the housing 300 side and a seal ring 20 equipped at a rotary shaft 200 side for rotating with the rotary shaft 200. And the mechanical seal device 1, according to closely contact and mutually sliding end faces of both rings 10, 20 which are opposed each other, in a sealed sliding portion S, leaking high pressure refrigerant $CO_2$ which exists in an internal space (high pressure environment) $\underline{P}$ to an external space (atmosphere) Q is prevented.

Note that the mating ring 10 in the present embodiment corresponds to one example of a stationary slide ring of the present invention, the seal ring 20 in the present embodiment corresponds to one example of a rotary slide ring.

The mating ring 10 comprises an about toroidal-shape as a whole, and is housed in an annular concave portion 302 formed at an end portion an axial opening 301 in a housing 300. An O-ring insertion groove 303 is formed at a cylindrical surface of the annular concave portion 300, a fixing O-ring 304 is equipped to the O-ring insertion groove. Therefore, the mating ring 10 is fit to the housing 300 hermetically and fixedly via the fixing O-ring 304. As a material to compose the mating ring 10, for instance, hard material such as ceramic and the like are exemplified.

Figure 2:
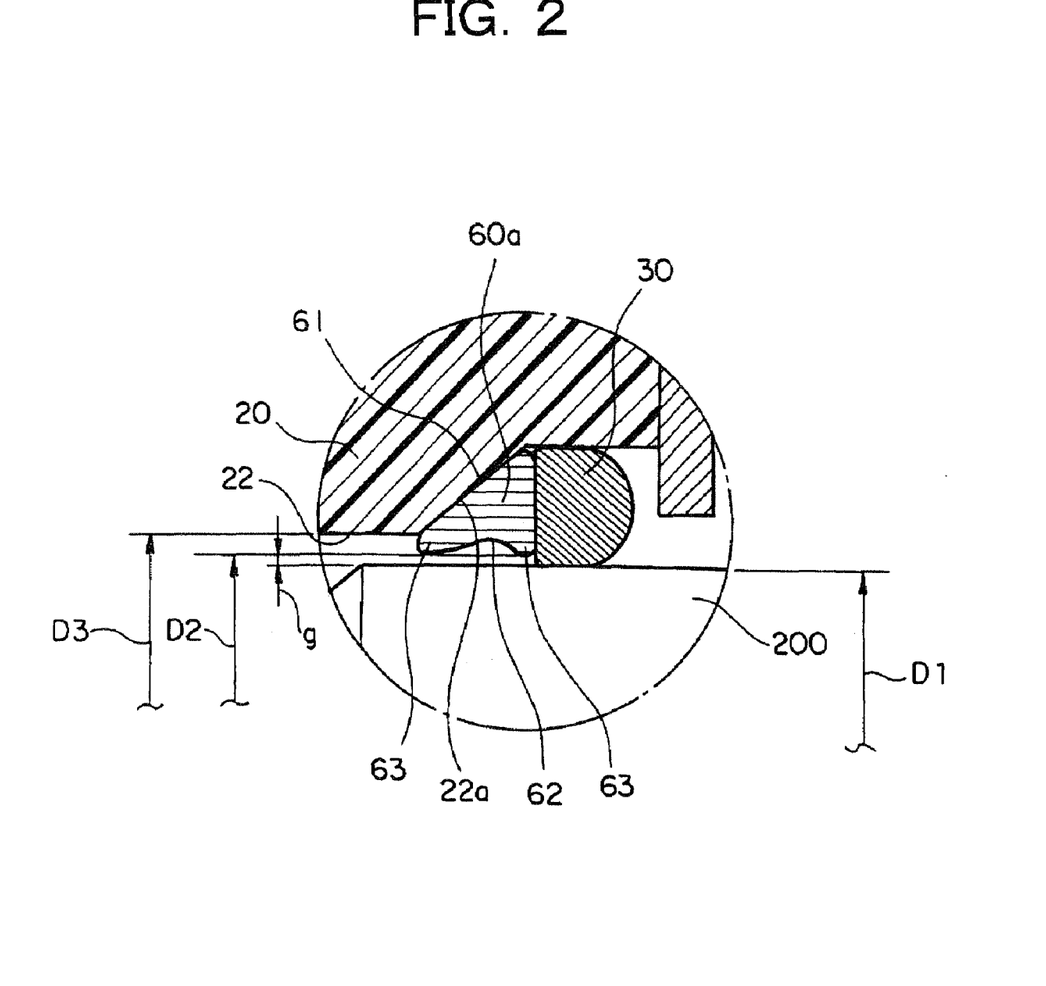
FIG. 2 is an enlarged view of II portion of FIG. 1.

The seal ring 20 also comprises an about toroidal-shape as a whole, a sliding projection portion 21 projected to the mating ring 10 side is continuously provided along with a circumferential direction. An annular ramp portion 22a is formed at an inner bore 22 of the seal ring 20, as shown in FIG. 2, the operational O-ring 30 is housed in the annular ramp portion 22a.

The seal ring 20 is movably provided on a circumference surface of a rotary shaft 200 along with the axis direction via the operational O-ring 30. As a material to compose the seal ring, for instance, self lubricate sliding member such as carbon and the like are exemplified. Also, as a material to compose the operational O-ring 30, for instance, hydrogenated nitrile rubber (HNBR) with a "Shore A" hardness of 80 degree is exemplified.

As shown in FIG. 1, a case 40 is arranged on a back face side of the seal ring 20 (an opposite side of the mating ring 10). The case 40 is composed of a flanged metal plate, and fits to an annular gap portion 201, which is formed on an outer circumference surface of the rotary shaft 200, therein. Also, an inner circumference portion of the case 40 is engaged with a notch portion 202 at a circumference direction which is formed on a circumference direction portion of the annular gap portion 201, and thereby the case 40 becomes rotatable with the rotary shaft 200.

At an outer circumference portion of the case 40, a plurality of engagement pawls 41 extended to an axial direction are formed with equally spaced at a circumference direction, these engagement pawls 41 engage with engagement notches 23 respectively, which are formed with equally spaced at a circumference direction on the outer circumference surface of the seal ring 20, under relatively movable condition in the axial direction. As a result, the seal ring 20 becomes rotatable with the case 40. On the other hand, an elastic member 50 is interposed between the back face of the seal ring 20 and the case 40 with pressed status in an axial direction. As this elastic member 50, for example, a coil wavespring can be used.

Namely, since the sliding projected portion 21 closely contact with the mating ring 10 by a biasing force along with an axial direction of the elastic member 50, and a rotary force of the rotary shaft 200 is transmitted via the case 40, the seal ring 20 rotates with the rotary shaft 200. And thereby, a sealed sliding portion S is formed between the mating ring 10 and the seal ring 20, an axial sealing function is performed.

The mechanical sealing device 1 according to the present embodiment comprises an annular backup ring 60a having toroidal-shape with an about triangular cross-sectional shape, as shown in FIG. 1 and FIG. 2. The backup ring 60a is housed in the annular ramp portion 22a of the inner bore 22 of the seal ring 20 as adjoining the operational ring 30 at atmosphere Q side.

The backup ring 60a is composed of, for example, synthetic resin materials having low gas permeability, such as polyamide, polyether-ketone (PEK), polyimide and the like. By composing the backup ring 60a with a material having low gas permeability, it is possible to prevent effluent of the gas permeated the operational ring 30 to atmosphere Q side. Note that, the backup ring 60a corresponds to one example of the ring member of the present invention.

The backup ring 60a comprises an inner diameter which satisfies a following conditional expression (1).

$D1 < D2 < D3$      expression (1)

Note that in the above expression (1), D1 is a diameter of a portion of the rotary shaft 200 where the backup ring 60a is positioned on an outer circumference thereof, D2 is an inner diameter of the backup ring 60a, D3 is an inner diameter of a portion positioned at atmosphere Q side from the backup ring 22 in the inner bore of the seal ring 20.

The space g (=D2−D1) is preferably larger than 0 mm and not more than 0.3 mm (0 mm<g≦0.3 mm), more preferably larger than 0 mm and not more than 0.2 mm (0 mm<g≦0.2 mm). When the space g is larger than 0.3 mm, the operational O-ring 30 is liable to bite into the space g.

By the backup ring 60a fulfills a relation D2<D3, the space g becomes narrower (a permeable area becomes smaller), biting of the operational O-ring 30 to the space g can be prevented. Also, by the backup ring 60a fulfills a relation D1<D2, the backup ring 60a is arranged to the outer circumference of the rotary shaft 200 with space.

Therefore, according to providing the backup ring 60a which fulfills the above mentioned conditional expression (1), following ability of the seal ring 20 along the thrust direction to the mating ring 10 can be maintained sufficiently, excellent sealing effect can be maintained.

Also, the backup ring 60a comprises a tapered circumference surface 61 which becomes narrower to atmosphere Q side from high pressure environment P side. The annular ramp portion 22a of the inner bore 22 of the seal ring 20 is also formed as tapered shape which becomes narrower to atmosphere side Q from high pressure environment P side so as to correspond to the tapered outer circumference surface 61 of the backup ring 60a. And, the backup ring 60a is provided on the annular ramp portion 22a of the seal ring 20 so that the tapered outer circumference face 61 of the backup ring 60a is come in contact with the tapered inner circumference face 22a of the seal ring 20.

According to such constitution, in case that the O-ring 30 and the backup ring 60a are pushed to atmosphere Q side by pressure of high environment P, the tapered outer circumference face 61 of the backup ring 60a slides along with the tapered inner circumference face 22a of the seal ring 20. For this reason, the space g can be narrower further by acting a compressive force to a direction for narrowing the inner diameter of the backup ring 60a, the biting of the operational O-ring to the space g can be prevented more efficiently.

Further, since the gap g becomes narrower, a permeating area of the gas at the backup ring 60a which is low gas permeability becomes smaller, an excellent sealing effect can be maintained.

Furthermore, the backup ring 60a comprises an annular projected portion 63 which projects to inwardly of a diameter direction, in an inner circumference face 62 thereof. In the present embodiment, as shown in FIG. 2, two projected portions 63 are provided at both end portions of the inner circumference face 62 in a cross-section along with an axial direction of the backup ring 60a.

By providing this projected portion 63, even in case that the backup ring 60a contacts to the rotary shaft 200, a contact area thereof can be reduced. For this reason, in case that the rotary shaft 200 moves along with thrust direction, a frictional resistance between the rotary shaft 200 and the backup ring 60a can be decreased, so that the following ability of the seal ring 20 can be improved further.

As shown in FIG. 2, tips of respective projected portions 62 are formed as arcuate shape. Thereby, since the contact of the projected portion 62 and the rotary shaft can be made as point contact, the frictional resistance between the rotary shaft 200 and the backup ring 60a can be decreased further.

Figure 3:
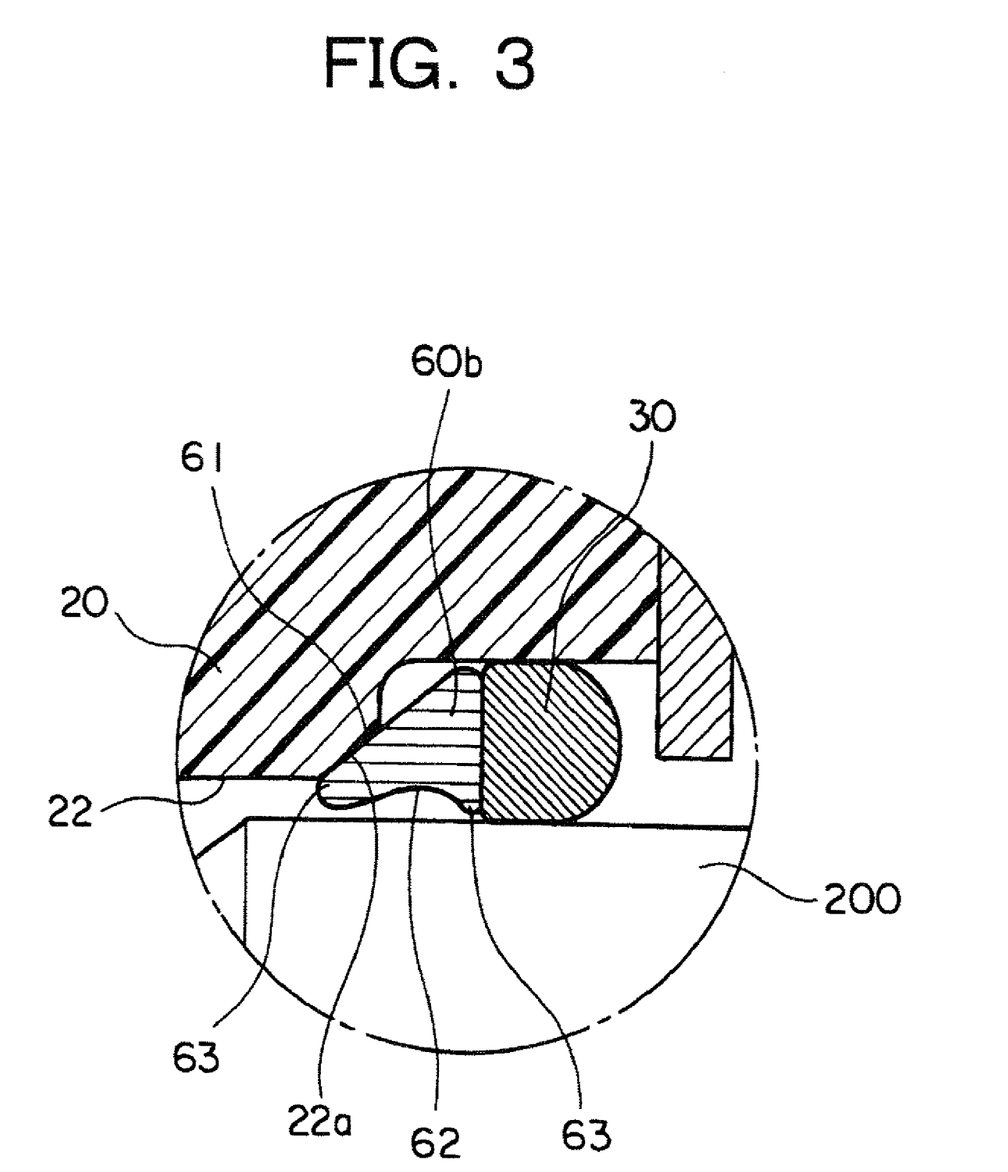
FIG. 3 is an enlarged view of a portion II of FIG. 1 in a mechanical sealing device according to a second embodiment of the present invention.

FIG. 3 is an enlarged view of a portion II of FIG. 1 in a mechanical sealing device according to a second embodiment of the present invention. As shown in FIG. 3, in a seal ring 20, a tapered inner circumference face 22b may be provided at only one portion of an annular ramp portion 22a, not at whole body. Note that the backup ring 60b is similar to the backup ring 60a in the first embodiment.

Figure 4:
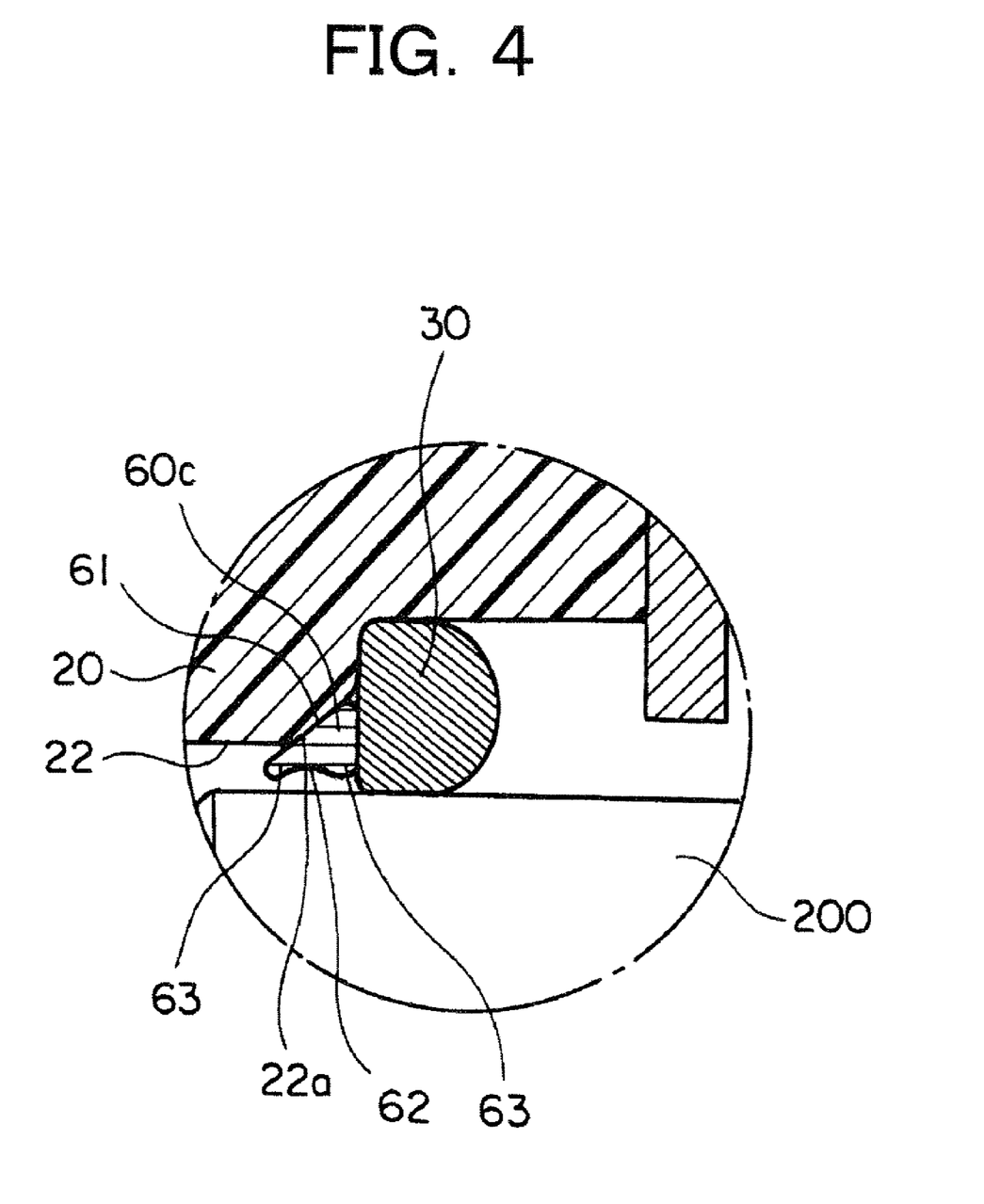
FIG. 4 is an enlarged view of a portion II of FIG. 1 in a mechanical sealing device according to a third embodiment of the present invention.

FIG. 4 is an enlarged view of a portion II of FIG. 1 in a mechanical sealing device according to a third embodiment of the present invention. As shown in the drawing, a height in a cross-section along with an axial direction of a backup ring 60c may be lowered significantly than a height in a cross-section along with an axial direction of an operational O-ring 30. Namely, the outer diameter of the backup ring 60c may be smaller than the outer diameter of the operational O-ring 30. In this case, it is preferable to meet a tapered shape of an annular ramp portion 22a of the seal ring 20 with a shape of the backup ring 60c in which the outer diameter thereof becomes lower.

Figure 5:
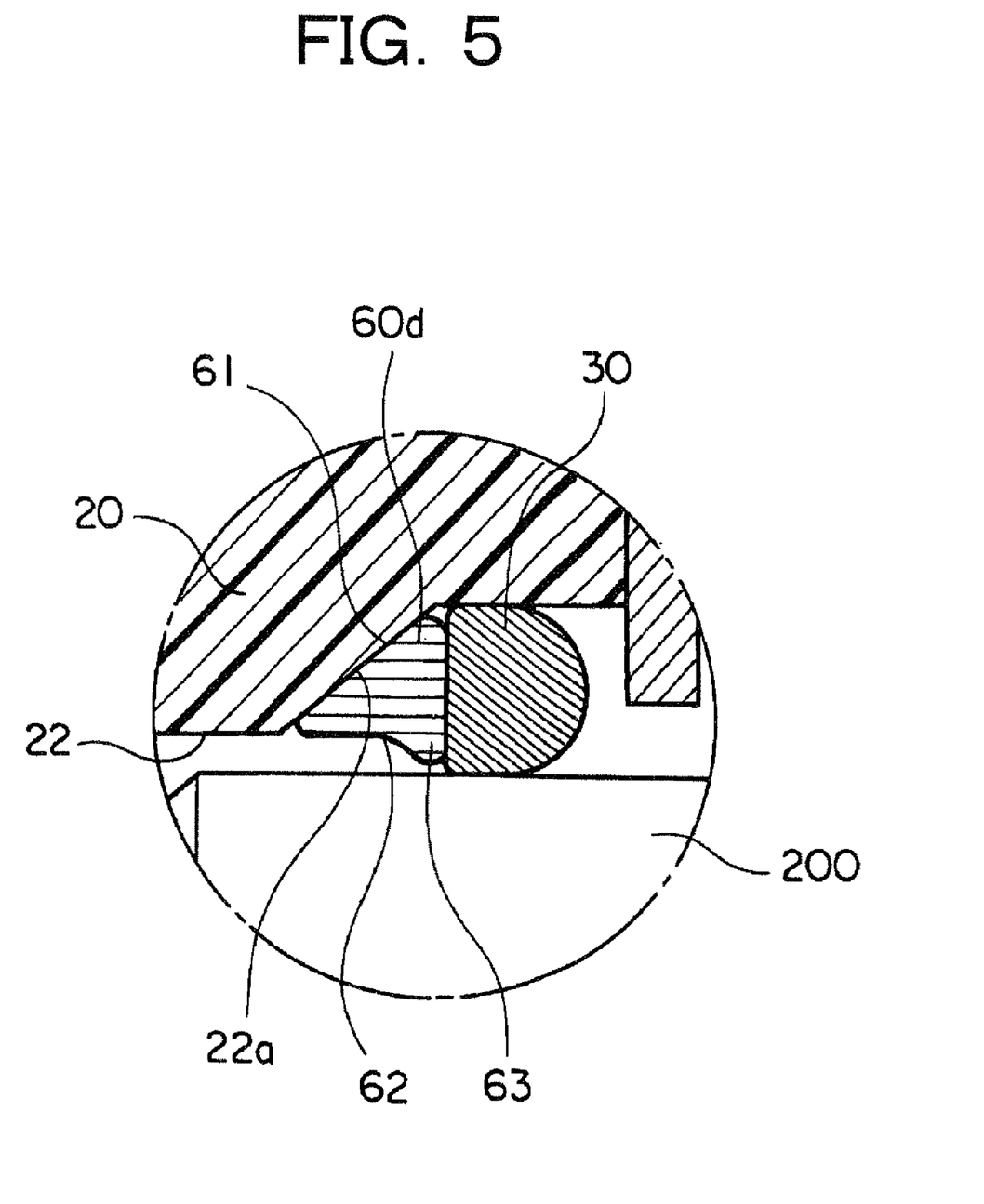
FIG. 5 is an enlarged view of a portion II of FIG. 1 in a mechanical sealing device according to a fourth embodiment of the present invention.

FIG. 5 is an enlarged view of a portion II of FIG. 1 in a mechanical sealing device according to a fourth embodiment of the present invention. As shown the drawing, in an inner circumference face 62 of a backup ring 60d, a projected portion may be provided only at an end portion which is adjacent to an operational O-ring 30, not at both end portions.

Figure 6:
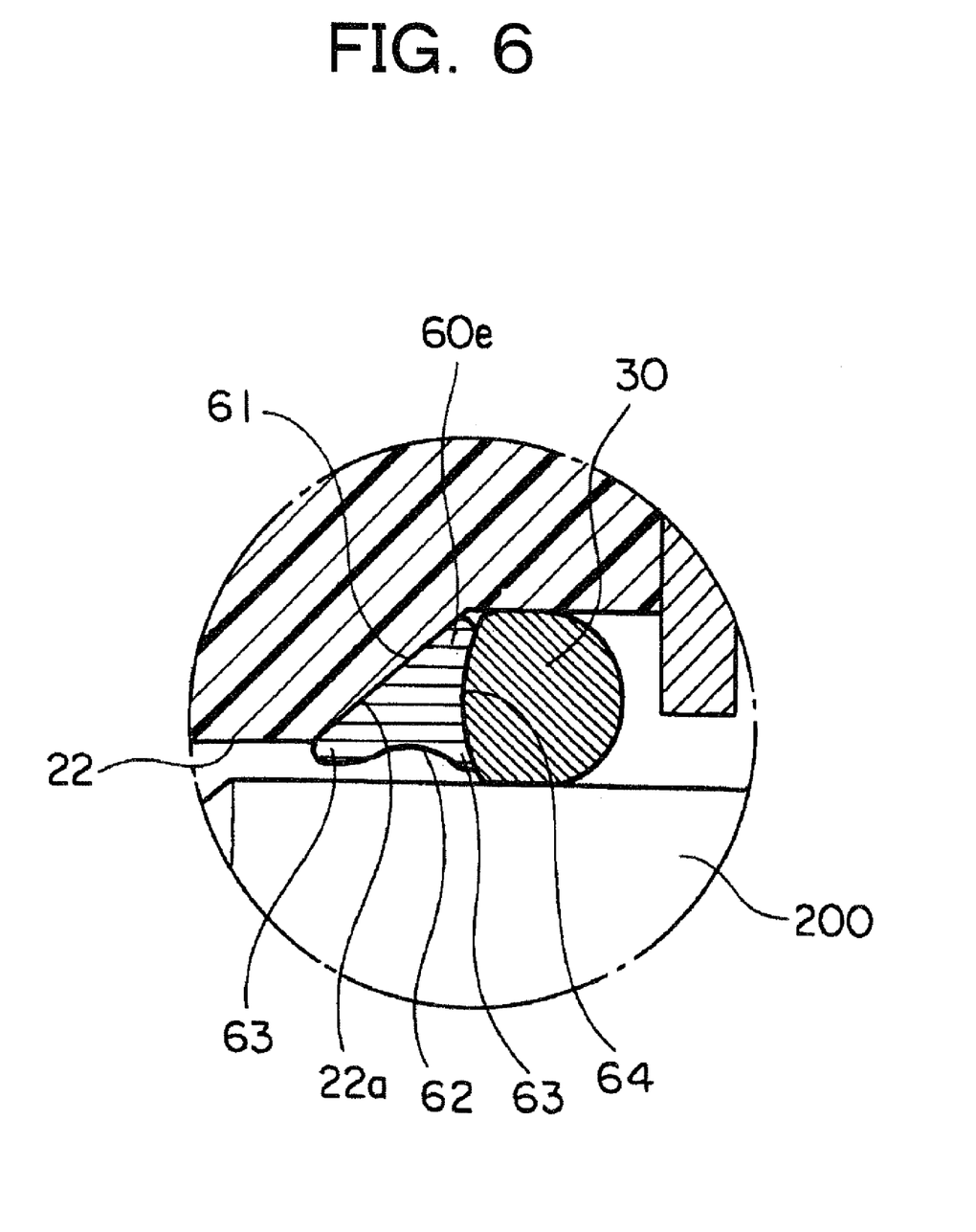
FIG. 6 is an enlarged view of a portion II of FIG. 1 in a mechanical sealing device according to a fifth embodiment of the present invention.

FIG. 6 is an enlarged view of a portion II of FIG. 1 in a mechanical sealing device according to a fifth embodiment of the present invention. As show in the drawing, a side face 64 of an O-ring side at a backup ring 60e may be a concave curved surface. According to providing such concave curved side face 64, protrusion of the operational O-ring 30 by a compressive force of gas to a space g side can be restricted.

Next, operation will be specified.

When a compressor is driven, a part of mixed refrigerant oil exists in $CO_2$ gas as mist form intervenes to a sealed sliding portion S to form a lubricant oil film. Thereby, the sealed sliding portion S is lubricated well, and $CO_2$ gas passage to atmosphere Q side is blocked.

In this case, although the operational O-ring 30 is pushed to atmosphere Q side by a pressing force of high environment P, in the present embodiment, since the space g becomes narrower by the backup ring 60a having the inner diameter which fulfills a relation of D2<D3 on the above conditional expression (1), the biting of the operational O-ring 30 to the space g is prevented at a time of applying compressive force.

Further, in the above conditional expression (1), by satisfying a relation D1<D2, the backup ring 60a is arranged and spaced to the outer circumference face of the rotary shaft 200. Therefore, even the rotary shaft 200 moves to thrust direction, the sealed sliding portion S is not enlarged by moving the seal ring 20 with the rotary shaft 200, an excellent sealing performance can be maintained. Also, effusion of the CO2 gas to atmosphere Q side by permeating can be restricted, because the gas permeability of the backup ring 60a becomes lower than that of the operational O-ring 30.

Even the backup ring 60a is compressed to atmosphere Q side by a pressure of high pressure environment P, in this case, the tapered outer circumference face 61 of the backup ring 60a slides along with the tapered inner circumference face 22a of the seal ring 20. Thereby, the compression force of high pressure environment P acts to a direction which makes that the inner diameter of the backup ring 60a narrower, the gap g becomes narrower further, the biting of the operational O-ring 30 to the space g can be prevented further. Also, the gap g becomes narrower the more, since a gas permeating area at the backup ring 60a becomes smaller, a sealing performance is improved.

As above, in the mechanical sealing device according to embodiments of the present invention 1, since the following capability along with thrust direction of the seal ring 20 can be improved as well as the restriction of the gas effusion to atmosphere Q side becomes possible, an excellent sealing performance can be comprised.

For example, calculating annual leakage amounts of the present invention and a conventional structure by using a theoretical formula shown in a following expression (2) respectively, as shown in Table 1, it is noted that the sealing performance improves significantly in the present invention compare with the conventional structure without using the backup ring. Note that, when calculating the annual leakage amounts, the space g as a permeate cross-section area s and a wire diameter of the operational O-ring 30 as a permeate rout length L are substituted to the following theoretical formula, a pressure is 5 MPa and a temperature is 120° C.

[numeral 1]

$$\text{annual\_leakage\_amount [g/year]} = 44.0 \text{ [g/mol]} \times \frac{b \times s \times t \times p}{L \times 22410 \text{ [cm}^3(STP)/\text{mol]}} \quad (2)$$

Note:

- $b$: gas permeate parameter [cm$^3$(STP)/cm/cm$^2$/sec/Pa]
- $s$: permeate cross-section area [cm$^2$]
- $t$: permeate time [sec]
- $p$: pressure [Pa]
- $L$: permeate *rout* length [cm]

TABLE 1

|  | Gas Permeate Amount [g/year] |
|---|---|
| Present Invention Structure | 0.03 |
| Conventional Structure | 24.01 |

Note that, the above specified embodiments are described in order to understand the present invention easily, and not for limiting the present invention. Therefore, it is intended that respective elements disclosed in the above described embodiments include all design around and equivalents included in the technical scope of the present invention.

The invention claimed is:

1. A mechanical sealing device comprising:
   a stationary slide ring hermetically fixed in a housing;
   a rotary slide ring which slides and closely contacts with said stationary slide ring, the rotary slide ring being rotatable with a rotary shaft inserted to an inner bore;
   an O-ring housed in an annular ramp portion of an inner bore of said rotary slide ring; and
   an annular ring member forming a triangle shape in axial section housed in said annular ramp portion of said inner bore of said rotary slide ring as adjoining said O-ring at an atmosphere side;
   wherein said rotary slide ring is provided on an outer circumference face of said rotary shaft is movable in the axial direction of said rotary shaft via said O-ring,
   wherein said annular ramp portion of said inner bore of said rotary slide ring comprises an inner circumference face tapered to become gradually narrower from a high pressure environment side toward an atmosphere side,
   wherein said annular ring member is made of material having a relatively lower gas permeability than that of said O-ring, and comprises a tapered outer circumference face of which an outer diameter becomes smaller from the high pressure environment side towards the atmosphere side to correspond to the tapered inner circumference face of said annular ramp portion of said inner bore of said rotary slide ring and an inner circumferential face in which an annular projected portion is provided at an end portion adjacent to said O-ring in a cross-section along an axial direction of said annular ring member, said annular projected portion projecting radially inward,
   wherein said tapered outer circumferential face of said ring member and said tapered inner circumferential face of said rotary slide ring contact each other, and
   wherein an expression D1<D2<D3 is satisfied in which D1 is a diameter of said rotary shaft, D2 is an inner diameter of said annular projected portion of said ring member, and D3 is an inner diameter of a portion at said atmosphere side from said ring member in the inner bore of said rotary slide ring.

* * * * *